(12) United States Patent
Endo

(10) Patent No.: US 7,942,327 B2
(45) Date of Patent: May 17, 2011

(54) MAGNETIC DATA PROCESSING APPARATUS AND NOISE REDUCTION METHOD FOR SUCH APPARATUS

(75) Inventor: Katsuyuki Endo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 121 days.

(21) Appl. No.: 11/973,848

(22) Filed: Oct. 10, 2007

(65) Prior Publication Data

US 2008/0093453 A1 Apr. 24, 2008

(30) Foreign Application Priority Data

Oct. 18, 2006 (JP) ................................. 2006-283479

(51) Int. Cl.
*G06K 7/08* (2006.01)
(52) U.S. Cl. ..................... 235/450; 235/449; 360/123.06
(58) Field of Classification Search .................. 235/450; 360/313–327
See application file for complete search history.

(56) References Cited

U.S. PATENT DOCUMENTS

| | | | | |
|---|---|---|---|---|
| 3,593,414 | A * | 7/1971 | Beun et al. ................. | 29/603.16 |
| 4,755,900 | A * | 7/1988 | Zarr .......................... | 360/130.1 |
| 6,154,617 | A | 11/2000 | Miyamoto | |
| 6,290,129 | B2 * | 9/2001 | Momose ....................... | 235/449 |
| 2006/0186203 | A1 * | 8/2006 | Buttifant et al. ............. | 235/450 |

FOREIGN PATENT DOCUMENTS

| | | |
|---|---|---|
| JP | 10-10634 | 1/1998 |
| JP | 10-282566 | 10/1998 |
| JP | 11-306502 | 11/1999 |
| JP | 2006-179060 | 7/2006 |

OTHER PUBLICATIONS

Vasic et al., Bane, The Computer Engineering Handbook, 2002, CRC Press, LLC, pp. 2-3.*

* cited by examiner

*Primary Examiner* — Michael G Lee
*Assistant Examiner* — Tabitha Chedekel
(74) *Attorney, Agent, or Firm* — Michael T. Gabrik

(57) ABSTRACT

The magnetic data processing apparatus includes a magnetic head and a motor arranged to reduce noise due to leakage flux from the motor. The magnetic data processing apparatus may form a check processing apparatus 1 having an MICR head 2 and a transportation motor 11, which is preferably a stepping motor. The MICR head 2 and the transportation motor 11 are positioned relative to one another so that the rotational axis 42 of the transportation motor 11 is aligned with the longitudinal axis of the head gap 23 in the MICR head 2. In the head gap 23 of the MICR head 2 the direction of the leakage flux 44 from the transportation motor 11 is parallel to the long axis of the left and right head gap faces 23a and 23b defining the head gap 23. Because the detection sensitivity of the MICR head 2 is lowest in this direction, noise due to leakage flux 44 from the transportation motor 11 is suppressed and the MICR head 2 can read magnetic ink characters with good accuracy.

5 Claims, 6 Drawing Sheets

MAGNETIC DATA PROCESSING APPARATUS AND NOISE REDUCTION METHOD FOR SUCH APPARATUS

BACKGROUND OF THE INVENTION

1. Field of Invention

The present invention relates to a magnetic data processing apparatus such as a check reading apparatus having a magnetic head and a motor, and relates more particularly to an improvement for reducing noise produced in the magnetic head in response to leakage flux from the motor.

2. Description of Related Art

A check reading apparatus conveys a check on which magnetic ink characters are printed through the transportation path on which a magnetic head is disposed to read the magnetic ink character information. A stepping motor or other type of electric motor is used as the drive source of the transportation mechanism for conveying the check. Such motors produce leakage flux which can cause the magnetic head to produce noise represented by electromotive forces. Noise produced by the magnetic head will interfere with its reading the information in the magnetic ink characters on the check. It is therefore necessary to suppress the noise caused by leakage flux from the motor.

Japanese Unexamined Patent Appl. Pub. JP-A-H11-306502 teaches a mechanism for suppressing this noise. The mechanism taught in JP-A-H11-306502 covers the motor with a shield plate to control the direction of leakage flux from the motor, and positions the motor and the magnetic head relative to each other so that the flux is oriented in a direction that does not produce electromotive force (noise) in the coil of the magnetic head. This suppresses noise applied to the magnetic head due to leakage flux from the motor.

SUMMARY OF THE INVENTION

The magnetic data processing apparatus and noise reduction method of the present invention suppresses noise in the magnetic head caused by leakage flux from the motor without using a shield plate or a similar shielding member.

The magnetic data processing apparatus of the present invention comprises a magnetic head including a core with end faces spaced apart from one another for forming a head gap and a motor arranged relative to the magnetic head such that leakage flux emitted from the motor is oriented in alignment with the center axis of the motor and with both the magnetic head and motor positioned so that the longitudinal axis extending between the end faces of the head gap lies parallel to the center axis of the motor.

The magnetic head produces an electromotive force according to the change in the flux passing the narrow head gap. The flux detection sensitivity of the magnetic head is highest across the width of the head gap (the direction perpendicular to the sides of the head gap, the short dimension of the head gap), and is lowest in the direction perpendicular to the width (that is, parallel to the sides of the head gap, the long dimension of the head gap). The magnetic head and the motor are positioned in this aspect of the invention so that the long dimension of the head gap in the magnetic head is parallel to the center axis of the motor. Because the leakage flux passes lengthwise through the head gap, it is difficult for the magnetic head to detect the leakage flux. Noise produced in the magnetic head by the leakage flux can therefore be effectively prevented or suppressed without using a shield plate.

In another aspect of the invention the relative positions of the magnetic head and the motor are set as follows. In this aspect of the invention the magnetic data processing apparatus has a magnetic head and a motor, and the motor emits leakage flux aligned with the center axis of the motor. The magnetic head and the motor are positioned so that the center axis of the motor is positioned on a plane of symmetry of the head gap in the magnetic head.

In this aspect of the invention the center axis through the center of the motor is positioned on the plane of symmetry (reflection surface) of the head gap, which is a plane that passes through the widthwise center of the head gap and is parallel to the opposing surfaces that define the head gap. The path of leakage flux from the motor is therefore parallel to the plane of symmetry in the head gap of the magnetic head, that is, parallel to the surfaces defining the head gap, and this leakage flux is effectively undetectable by the magnetic head.

In another aspect of the invention the relative positions of the magnetic head and the motor are set as follows. In this aspect of the invention the magnetic head and the motor are positioned so that the axis of symmetry of the head gap in the magnetic head and the center axis of the motor are parallel, and the magnetic head and the motor are disposed to the center axis at a position where the leakage flux components passing through the head gap are cancelled. Noise in the magnetic head caused by leakage flux from the motor can be prevented or suppressed by thus positioning the magnetic head and the motor.

Further preferably, the magnetic head is oriented to a tangent of a circle centered on the center axis of the motor. This arrangement makes the position where noise due to the leakage flux is minimized is obvious along the center axis of the motor. More specifically, the magnetic head and the motor can be easily positioned relative to each other in the direction of the center axis of the motor so that the leakage flux components passing through the head gap are cancelled.

When the magnetic data processing apparatus of the invention is used in a check processing apparatus, for example, the magnetic head is used for reading magnetic ink characters printed on a recording medium, and the motor is a transportation motor used for conveying the recording medium passed the reading position of the magnetic head. A stepping motor can be used as the motor.

Another aspect of the invention is a noise reduction method for reducing noise produced in a magnetic head by leakage flux from a motor, wherein the leakage flux is emitted in a direction aligned with the center axis of the motor; and the orientations of the magnetic head and the motor are set so that the longitudinal axis of the head gap in the magnetic head is parallel to the center axis of the motor.

In a noise reduction method according to another aspect of the invention the orientations of the magnetic head and the motor are set so that the center axis of the motor is positioned on a plane of symmetry of the head gap in the magnetic head.

In a noise reduction method according to another aspect of the invention the orientations of the magnetic head and the motor are set so that the axis of symmetry of the head gap in the magnetic head and the center axis of the motor are parallel, and the relative positions of the magnetic head and the motor in the direction of the center axis are set so that leakage flux components passing through the head gap are cancelled.

In this arrangement the magnetic head is preferably aligned with a tangent of a circle centered on the center axis of the motor such that the tangent intersects the longitudinal axis of the head gap.

The invention can effectively prevent or suppress the imposition of noise on the detection signal of the magnetic head due to leakage flux from the motor without using a shield plate or similar member by simply controlling the relative positions of the magnetic head and the motor. The invention is thus advantageous for reducing the size and cost of a check processing apparatus or similar magnetic data processing apparatus.

Other objects and attainments of the present invention will become apparent and appreciated by referring to the following description and claims taken in conjunction with the accompanying drawings.

DESCRIPTION OF PREFERRED EMBODIMENTS

A preferred embodiment of the present invention is described below with reference to the accompanying figures.

Figure 1:
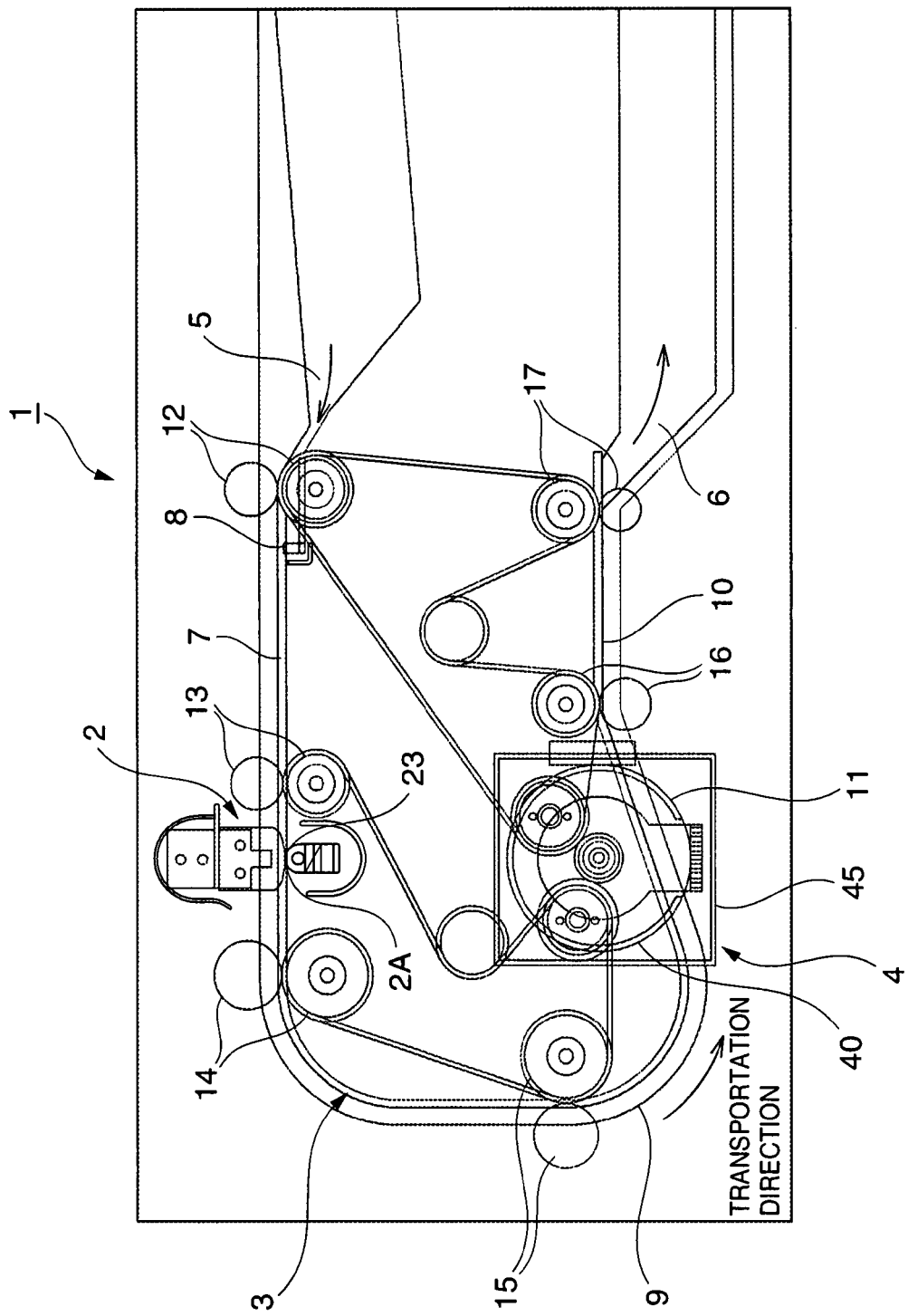
FIG. 1 describes the internal arrangement of a check processing apparatus according to an embodiment of the invention.

FIG. 1 describes the internal arrangement of a check processing apparatus according to an embodiment of the invention. This check processing apparatus 1 has an MICR (magnetic ink character recognition) head 2 for reading the magnetic ink character information printed on a check, and a transportation mechanism 4 for conveying the check through a transportation path 3 passed the reading position 2A of the MICR head 2. The check processing apparatus 1 also has a check supply unit 5 for feeding the checks to be read into the transportation path 3, and a check discharge unit 6 for receiving and removing the read checks from the transportation path 3.

The transportation path 3 is basically U-shaped. A magnet 8 for magnetizing the magnetic ink characters is disposed in the middle of the upstream-side transportation path portion 7 that is connected to the check supply unit 5, and the MICR head 2 is located at a position downstream in the check transportation direction from this magnet 8. The downstream-side transportation path portion 10 that is connected to the upstream-side transportation path portion 7 by the curved transportation path portion 9 conveys the check in a direction reversed 180 degrees from the upstream-side transportation path portion 7 and guides the check into the check discharge unit 6.

The transportation mechanism 4 includes a transportation motor 11, which is a stepping motor in this embodiment of the invention, and plural sets of transportation rollers that are rotationally driven by the transportation motor 11. This aspect of the invention has six transportation roller pairs 12 to 17 disposed along the transportation path 3. The transportation motor 11 is located near the inside of the downstream-side transportation path portion 10.

Figure 2A:
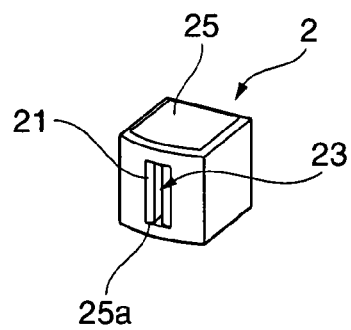
FIG. 2A, FIG. 2B, and FIG. 2C describe the construction and operation of the magnetic head.
Figure 2B:
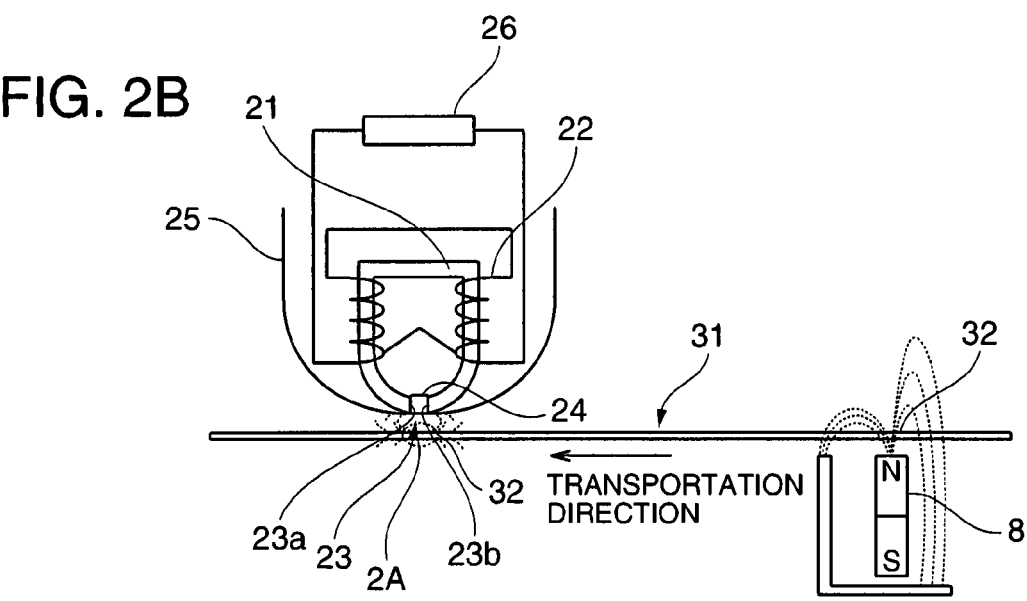
Figure 2C:
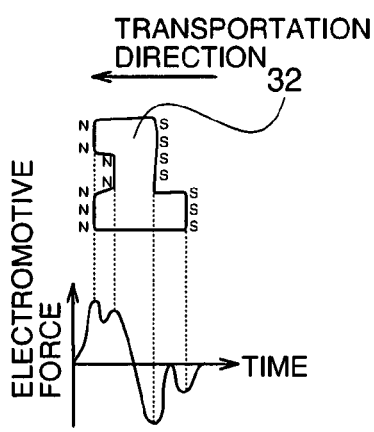

FIG. 2A is an oblique view of the MICR head 2, FIG. 2B describes the reading operation of the MICR head 2, and FIG. 2C is a signal waveform showing an example of the read signal. These figures are referenced in the following description. The distal end of the MICR head 2 is semicircular with a gap formed in the center, and includes a frame-shaped head core 21 made from a magnetic material and a coil winding 22 that is wound to the left and right parts of the frame-shaped head core 21.

The left and right end surfaces facing the gap in the distal end of the frame-shaped head core 21 are head gap faces 23a and 23b, and these faces define the head gap 23. A spacer 24 that is made from a nonmagnetic material is disposed in this head gap 23. The frame-shaped head core 21 and the coil winding 22 are covered by a shield case 25, and only the head gap 23 is exposed from a rectangular opening 25a rendered in the curved distal end part of the shield case 25. The electromotive force produced in the coil winding 22 can be extracted through a signal amplification circuit 26.

The MICR head 2 is disposed so that the head gap 23 exposed from the curved distal end part opposes the position passed by the magnetic ink characters 32 on the conveyed check 31. The check 31 is magnetized by the magnet 8 in the transportation direction before the check passes the reading position 2A of the MICR head 2. In this aspect of the invention the magnetic ink characters 32 are magnetized so that the downstream side in the transportation direction is north and the upstream side in the transportation direction is south.

When the magnetized magnetic ink characters 32 then pass the reading position 2A of the MICR head 2, electromotive force is produced by magnetic induction in the MICR head 2, and this force is amplified and output by the signal amplification circuit 26. If the magnetic ink character is the numeral "1", for example, an electromotive force with a waveform as shown in FIG. 2C is produced, and based on this waveform the value of the magnetic ink character 32 is recognized by the check processing apparatus 1 or the signal is sent to a host computer connected to the check processing apparatus 1 and recognized by the host computer.

Position of the MICR Head Relative to the Transportation Motor

Figure 3A:
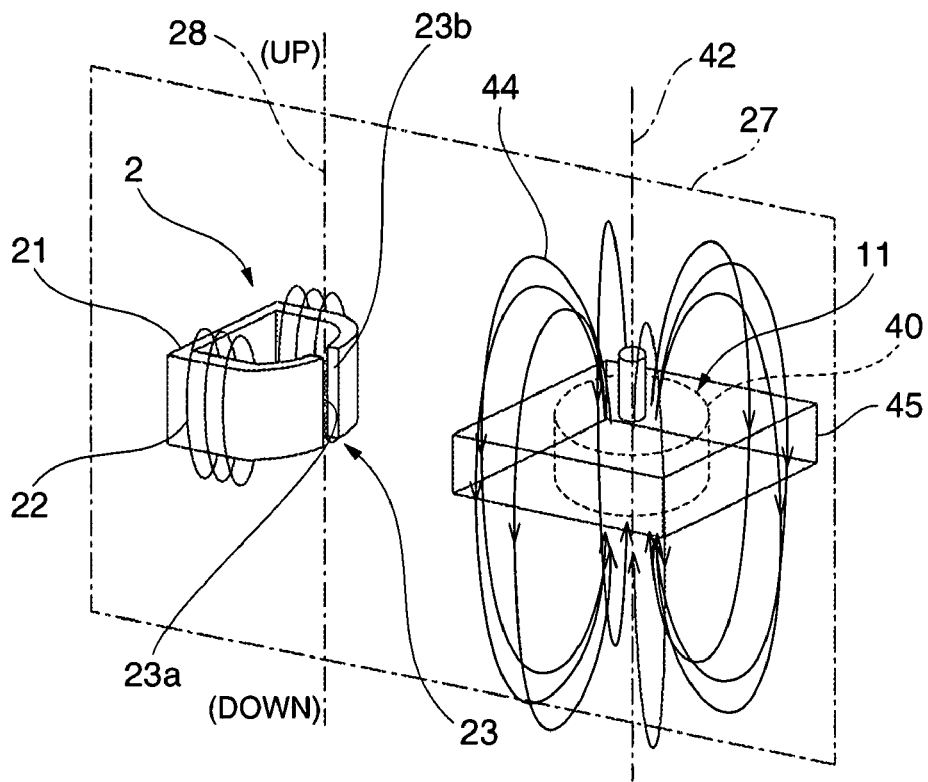
FIG. 3A and FIG. 3B describe the relative positions of the magnetic head and the transportation motor.
Figure 3B:
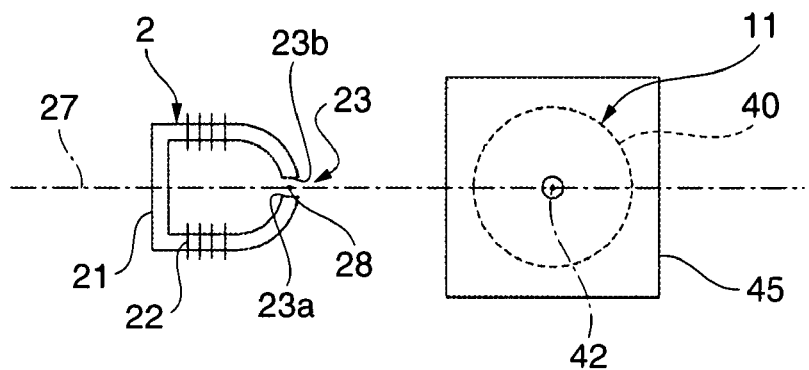

FIG. 3A and FIG. 3B are an oblique view and a plan view, respectively, schematically showing the relative positions of the MICR head 2 and the transportation motor 11. When the drive coil of the transportation motor 11, which is a stepping motor in this aspect of the invention, is energized, leakage flux 44 is output from the motor case 40 along any plane containing the rotational axis 42 passing through the center of the motor case 40. The transportation motor 11 is covered by a box-shaped shield case 45, but the shield case 45 cannot completely prevent flux from leaking to the outside, leakage flux 44 leaks to the outside in the direction of the rotational axis 42, travels in a loop along a long elliptical path and returns in the direction of the rotational axis 42 on the opposite side. Except for above and below the transportation motor 11, the leakage flux 44 leaking externally to the shield case 45 is substantially parallel to the rotational axis 42.

The MICR head 2 produces an electromotive force according to the change in the flux passing the head gap 23. The flux detection sensitivity of the MICR head 2 is highest across the width of the head gap 23 (the direction perpendicular to the head gap faces 23a and 23b), and is lowest in the direction perpendicular to the width (that is, parallel to the head gap faces 23a and 23b, the longitudinal direction of the head gap 23). In the check processing apparatus 1 according to this aspect of the invention the rotational axis 42 of the drive coil of the transportation motor 11 (i.e. center axis of motor 11) is positioned on a plane of symmetry 27 (reflection surface) of the head gap 23, that is, a plane that intersects the center of the width of the head gap 23 and extends parallel to the head gap faces 23a and 23b (parallel to the long axis of the head gap 23).

The path of leakage flux 44 from the transportation motor 11 is therefore parallel to the plane of symmetry 27 in the head gap 23 of the MICR head 2, that is, parallel to the head gap faces 23a and 23b, the electromotive force produced by this leakage flux 44 is minimal and is actually too weak to be detected by the MICR head 2. Noise can thus be effectively prevented from being applied to the MICR head 2 by the leakage flux 44.

Figure 4:
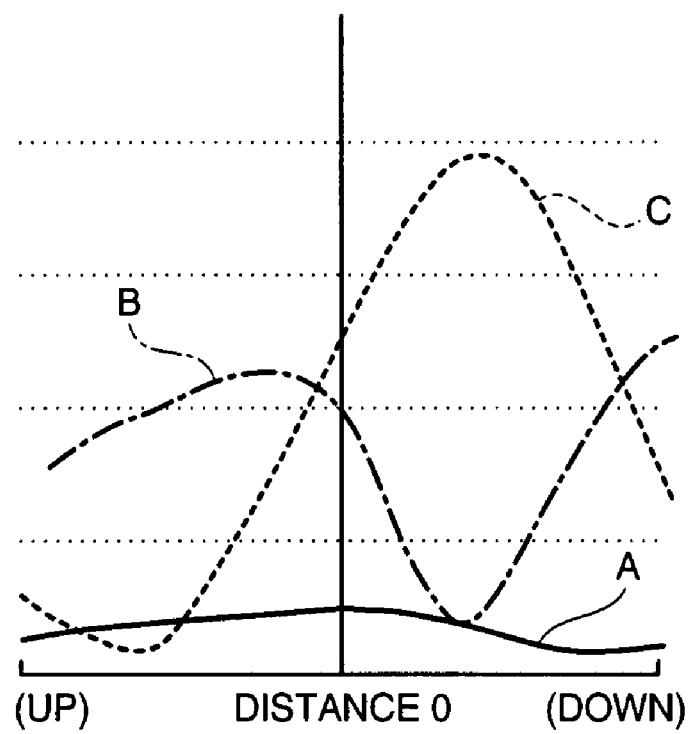
FIG. 4 is a graph of the noise level in the magnetic head.

Curve A in FIG. 4 denotes the level of noise applied by leakage flux 44 to the MICR head 2. The y-axis in this figure denotes the level of noise produced in the MICR head 2, and the x-axis denotes the distance of the MICR head 2 from the origin (0) when the MICR head 2 is moved parallel to the rotational axis 42 (up or down in FIG. 3A, FIG. 5A, FIG. 6A) without changing the attitude (tilt) of the MICR head 2 where the origin (0) is the center of the rotational axis of the transportation motor 11 (the enter of the transportation motor 11).

Curve A results when the relative positions of the MICR head 2 and the rotational axis 42 of the transportation motor 11 are as shown in FIG. 3A and FIG. 3B. Curve B results when these positions are as shown in FIG. 5A and FIG. 5B, and curve C results when these positions are as shown in FIG. 6A and FIG. 6B.

As will be known from curve A, the level of noise applied to the MICR head 2 is suppressed to a level that poses no problem for practical use. The noise level remains low even when the MICR head 2 is moved vertically. The relative vertical positions of the transportation motor 11 and MICR head 2 can therefore be set desirably, thus affording a high degree of positioning freedom.

Alternative Arrangements

Figure 5A:
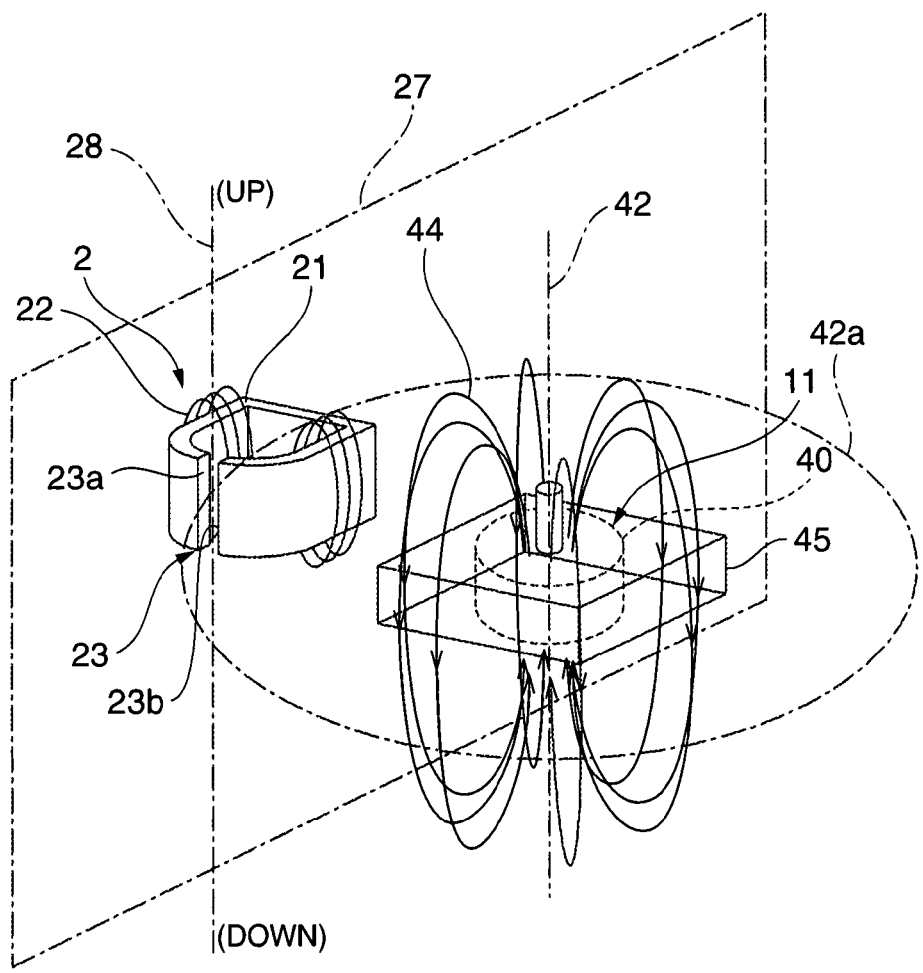
FIG. 5A and FIG. 5B describe the relative positions of the magnetic head and the transportation motor in another aspect of the invention.
Figure 5B:
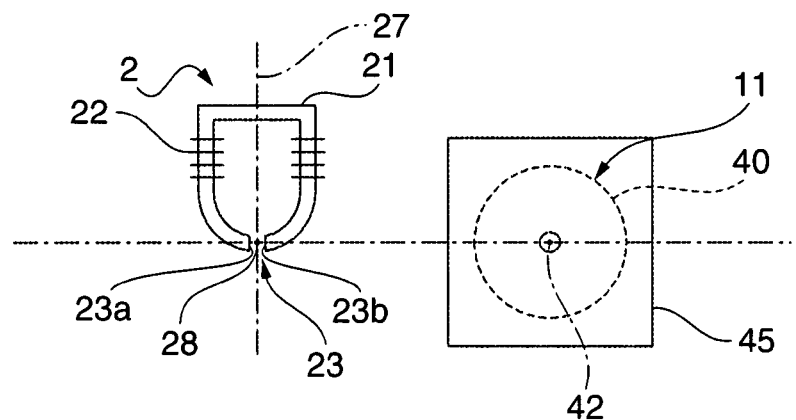
Figure 6A:
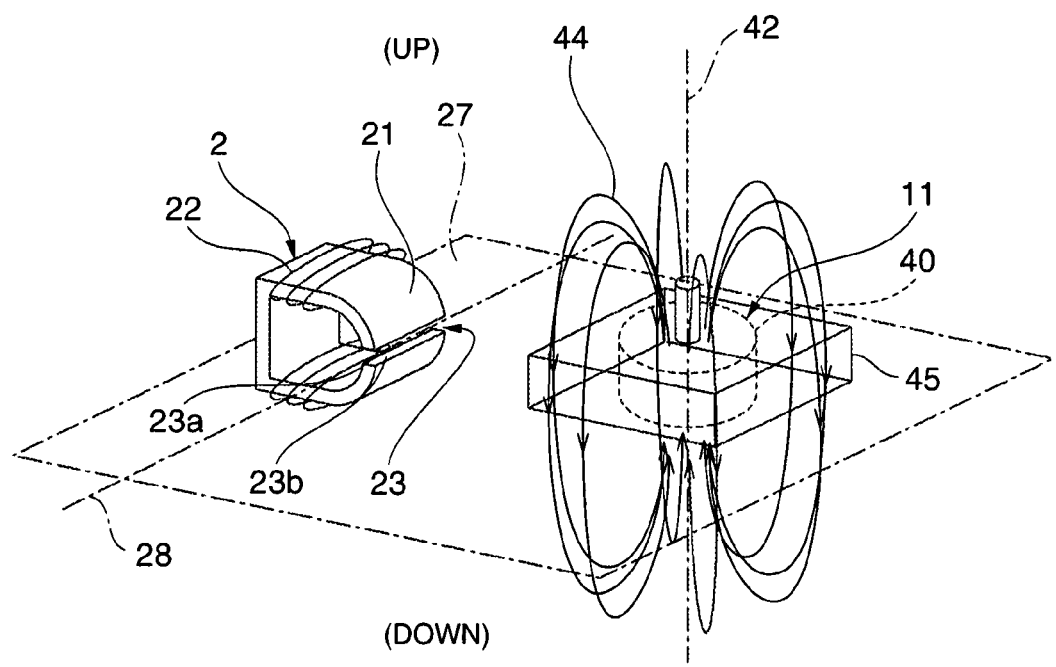
FIG. 6A and FIG. 6B describe the relative positions of the magnetic head and the transportation motor in an example used for comparison.
Figure 6B:
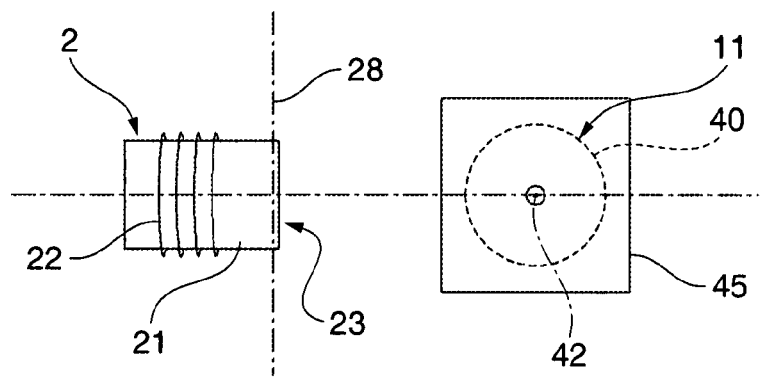

FIG. 5A and FIG. 5B are an oblique view and a plan view schematically showing the arrangement of the MICR head 2 and the transportation motor 11 according to another aspect of the invention. In this aspect of the invention the relative positions of the MICR head 2 and the transportation motor 11 are set so that the rotational axis 42 of the drive coil of the transportation motor 11 (hereafter center axis of motor 11) is parallel to the axis of symmetry 28 of the head gap 23, the axis of symmetry 28 extending parallel to and through the center between the head gap faces 23a and 23b.

The MICR head 2 is also oriented with a tangent of a circle 42a of which the center is the rotational axis 42 of the transportation motor 11.

The MICR head 2 thus positioned is then moved parallel to the rotational axis 42 and relative to the transportation motor 11 to find the position where the noise produced in the MICR head 2 by leakage flux 44 from the transportation motor 11 is lowest to determine the positions of the MICR head 2 and the transportation motor 11 where the relative positions are as described above.

More specifically, when the MICR head 2 and the transportation motor 11 are thus positioned, the level of magnetic noise imposed on the detection signal of the MICR head 2 varies greatly according to the position of the MICR head 2 along the rotational axis 42 of the transportation motor 11, and there is a point of inflection where this level is lowest. At the position where this point of inflection appears, the leakage flux 44 through the head gap of the MICR head 2 is cancelled and the noise level is reduced to a level that is not a problem for practical use. The point of inflection position is offset to below the center (0 point) of the rotational axis 42 of the transportation motor 11 because of the effect of the shield case 45 and the motor case 40.

By positioning the MICR head 2 and the transportation motor 11 this way, noise produced in the MICR head 2 by leakage flux 44 from the transportation motor 11 can be suppressed.

The MICR head 2 is aligned with a tangent of a circle 42a centered on the rotational axis of the transportation motor 11, but the orientation of the MICR head 2 is not limited to a tangential direction and can face a different direction if the axis of symmetry 28 of the head gap 23 of the MICR head 2 is parallel to the rotational axis 42 of the transportation motor 11.

Comparative Example

For comparison the MICR head 2 and the transportation motor 11 were positioned as shown in FIG. 6A and FIG. 6B, and the level of noise produced in the MICR head 2 by the leakage flux 44 was measured. The results are denoted by curve C in FIG. 4.

In this comparison the plane of symmetry 27 of the head gap 23 of the MICR head 2 was positioned perpendicularly to the rotational axis 42 of the transportation motor 11. The axis of the leakage flux 44 in this arrangement is the same as the direction in which the detection sensitivity of the MICR head 2 is highest, and the noise level is therefore also high as indicated by curve C in FIG. 4. The level of noise produced in the MICR head 2 also cannot be lowered unless the transportation motor 11 and MICR head 2 are moved vertically to increase the distance between them.

The rotational axis 42 is used as the center axis of the transportation motor 11 in the foregoing arrangements, but the center axis is not limited to the rotational axis of the motor and can be any center axis in the leakage flux plane.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An assembly comprising a magnetic head and a motor adjacent the magnetic head, the magnetic head and motor being arranged to reduce noise produced in the magnetic head in response to leakage flux emitted from the motor, wherein:
   the magnetic head comprises opposed spaced apart end faces for forming a head gap;
   said leakage flux emitted from the motor in the form of a loop of leakage flux having an elliptical path of travel with the major axis of the elliptical path oriented in substantial parallel alignment with the center axis of the motor; and
   wherein the magnetic head and motor are arranged relative to one another so that a lengthwise dimension of the head gap lies parallel to the center axis of the motor.

2. The assembly described in claim 1, wherein the magnetic head is aligned with a tangent of a circle centered on the center axis of the motor.

3. An assembly comprising a magnetic head and a motor adjacent the magnetic head, the magnetic head and motor being arranged to reduce noise produced in the magnetic head in response to leakage flux emitted from the motor, wherein:
   the magnetic head comprises opposed end faces spaced apart from one another for forming a head gap;
   said leakage flux emitted from the motor in the form of a loop of leakage flux having an elliptical path of travel with the major axis of the elliptical path oriented in substantial parallel alignment with the center axis of the motor; and wherein the magnetic head and motor are arranged relative to one another so that the center axis of the motor lies in a plane extending symmetrically between the spaced apart end faces of the head gap.

4. An assembly comprising a magnetic head and a motor adjacent the magnetic head, the magnetic head and motor being arranged to reduce noise produced in the magnetic head in response to leakage flux emitted from the motor, wherein:

the magnetic head comprises opposed spaced apart end faces for forming a head gap;

said leakage flux emitted from the motor in the form of a loop of leakage flux having an elliptical path of travel with the major axis of the elliptical path oriented in substantial parallel alignment with the center axis of the motor; and wherein the magnetic head and motor are arranged relative to one another so that a lengthwise dimension of the end faces lies in parallel to the center axis of the motor.

5. A method for reducing noise produced in a magnetic head in response to leakage flux emitted from a motor adjacent the magnetic head, the emitted leakage flux being in the form of a loop having an elliptical path of movement with the major axis of the elliptical path being substantially parallel with the center axis of the motor, the method comprising:

forming a head gap between end faces of the magnetic head; and arranging the magnetic head and the motor relative to one another so that a lengthwise dimension of the head gap is substantially parallel to the center axis of the motor.

\* \* \* \* \*